United States Patent [19]

Schultz

[11] 4,396,171

[45] Aug. 2, 1983

[54] AIRCRAFT EJECTION SEAT CATAPULT DEVICE

[75] Inventor: Edwin R. Schultz, Waynesville, Ohio

[73] Assignee: The United States of America as represented by the Secretary of the Air Force, Washington, D.C.

[21] Appl. No.: 324,899

[22] Filed: Nov. 25, 1981

[51] Int. Cl.² .................................................. B64C 25/10
[52] U.S. Cl. .............................. 244/122 AD; 60/233; 102/347
[58] Field of Search ..... 244/122 A, 122 AB, 122 AC, 244/122 AD, 122 AE; 89/1 B, 1 F, 1 J, 1.816; 60/228, 229, 233; 102/347, 381

[56] References Cited

U.S. PATENT DOCUMENTS

| | | | |
|---|---|---|---|
| 2,937,830 | 5/1960 | Fulton | 244/122 AD |
| 2,996,272 | 8/1961 | Stott et al. | 244/122 AD |
| 3,102,383 | 9/1963 | Rex et al. | 60/26.1 |
| 3,130,947 | 4/1964 | Franks | 244/122 |
| 3,265,337 | 8/1966 | Martin | 244/122 |

*Primary Examiner*—Trygve M. Blix
*Assistant Examiner*—Ivy Shum
*Attorney, Agent, or Firm*—Donald J. Singer; Charles E. Bricker

[57] ABSTRACT

The acceleration applied to an ejection seat during the catapult phase of emergency escape from an aircraft is limited to a maximum value which can be tolerated by the ejectee by incrementally venting exhaust gas from the high pressure chamber of the ejection catapult. Such venting may be accomplished mechanically by a mass which acts in response to acceleration to open venting orifices, the mass being preloaded to prevent its movement until a desired acceleration is experienced. Alternatively, venting may be accomplished electromechanically.

8 Claims, 4 Drawing Figures

AIRCRAFT EJECTION SEAT CATAPULT DEVICE

RIGHTS OF THE GOVERNMENT

The invention described herein may be manufactured and used by or for the Government of the United States for all governmental purposes without the payment of any royalty.

FIELD OF THE INVENTION

This invention relates to a safety device and in particular to an aircraft ejection seat catapult device.

BACKGROUND OF THE INVENTION

Aircraft ejection seats generally comprise a seat pan mounted on a beam or frame adapted to be ejected with the seat pan bodily along a predetermined path from the aircraft, ejection means being provided to project the ejection seat from the aircraft in a predetermined direction relative to the aircraft, when required in an emergency. Ejection of the seat from the aircraft is generally effected by means of an ejection catapult comprising two or more telescopically cooperating parts adapted to be thrust axially apart by propulsion gases generated by the firing of at least one combustible cartridge. The ejection catapult operates between the seat frame and a fixed part of the aircraft, being located in such a position as to exert the thrust in the direction that it is desired that the ejection seat should travel as it moves from the aircraft.

When an ejection seat/airman combination is ejected from an aircraft in an emergency it is desirable that this combination should attain a high velocity in a predetermined direction in as short a time as possible consistent with the application of physiologically acceptable acceleration values to the airman. It is important that the trajectory of the seat/aircraft combination should be such that the combination will adequately clear all parts of the aircraft in any flight condition. It is also important that the combination should have sufficient time for the deployment and effective operation of the airman's parachute.

The ejection catapult of an ejection seat as described above can only produce an effective accelerating thrust during the time that the telescopically cooperating parts of the catapult are interengaged. This means that the ejection catapult must produce a very high short term acceleration in order to achieve a high seat/airman combination velocity. Accordingly, the maximum attainable velocity is limited by the maximum acceleration value that can safely be applied to the airman by the operation of the ejection catapult.

The combustible cartridge or propellant grain is designed to provide a required acceleration over ambient temperatures ranging from −65° F. to 160° F. It is known that the burning rate of many solid propellants varies considerably with the temperature. Thus, if conditions are adjusted for 70° F., then at −40° F. combustion may be slowed to an extent retarding acceleration so that the seat/airman combination may not be cleared above a tail fin or other part of an airplane. Conversely, if the conditions are adjusted for 70° F., then at +140° F., acceleration may be too high and likely to cause the airman to black out or suffer spinal or other physical damage.

The major variation in acceleration occurs during the initial period of the propellant burn, generally the first 120 to 175 milliseconds of the burn. This initial period may be termed "catapult stroke". For example, a cold catapult, i.e., a catapult at −65° F. exhibits about the same acceleration during the catapult stroke as during the remainder of the propellant burn, approximately 8 g's. In contrast, for a hot catapult, i.e., a catapult at +150° F., acceleration during the catapult stroke increases to about 14 g's, thereafter decreasing to about 8 g's. The data available are for a standard propelled weight of 400 pounds, i.e., combined weight of ejection seat and weight of the ejectee.

It is known to incorporate temperature compensating means into a rocket motor to insure a constant burning rate regardless of ambient temperature variations. For example, U.S. Pat. Nos. 2,612,747; 2,909,032; and 3,102,383 each disclose temperature responsive means for controlling the effective orifice area of the exhaust nozzle of the rocket motor in a manner to insure constant propellant burning rate.

It is also known to incorporate pressure relief means, as disclosed by U.S. Pat. No. 2,937,830, to vent excessive gas pressure to the atmosphere during the catapult stroke event.

The vertical acceleration experienced by an ejectee during the catapult stroke event is given by $a_Z = gF_c/W_e$, where $a_Z$ is the vertical acceleration, g is the acceleration due to gravity, $F_c$ is the catapult force and $W_e$ is the ejected weight. It can be seen that acceleration is increased either by increasing the catapult force or by decreasing the ejected weight. Thus, if adequate performance is achieved for a 237 pound ejectee at −65° F., the acceleration will be far too great for a 165 pound ejectee at +150° F. Therefore, what is desired is an ejection system which will limit the vertical acceleration of ejection seats during the catapult stroke event of emergency escape independent of ambient temperature and ejectee weight.

Accordingly, it is an object of the present invention to provide an ejection apparatus having means to limit the vertical acceleration of the ejection seat and its occupant during the catapult stroke event of emergency escape.

Other objects will be readily apparent to those skilled in the art by reading the following description and an examination of the accompanying drawings.

SUMMARY OF THE INVENTION

In accordance with the present invention there is provided an ejection system for emergency escape from an aircraft. The system comprises an ejection seat and an ejection apparatus for ejecting the seat from an aircraft. The apparatus comprises at least two telescopically cooperating parts, a first one of said parts having an opening at its top and the bottom of the first part being closed and attached to the aircraft, and a second one of said parts having an opening at its bottom and the top of the second part being closed and attached to the seat, the second part containing at least one propellant charge, and means cooperatively associated with the second part to vent exhaust gas generated by the propellant charge when ignited, in such manner as to limit the acceleration of the apparatus.

In one embodiment of the invention, the acceleration limiting means comprises mechanical venting means, as hereinafter described.

According to another embodiment of the invention, the acceleration limiting means comprises electromechanical control and venting means, as hereinafter described.

DETAILED DESCRIPTION OF THE INVENTION

Figure 1:
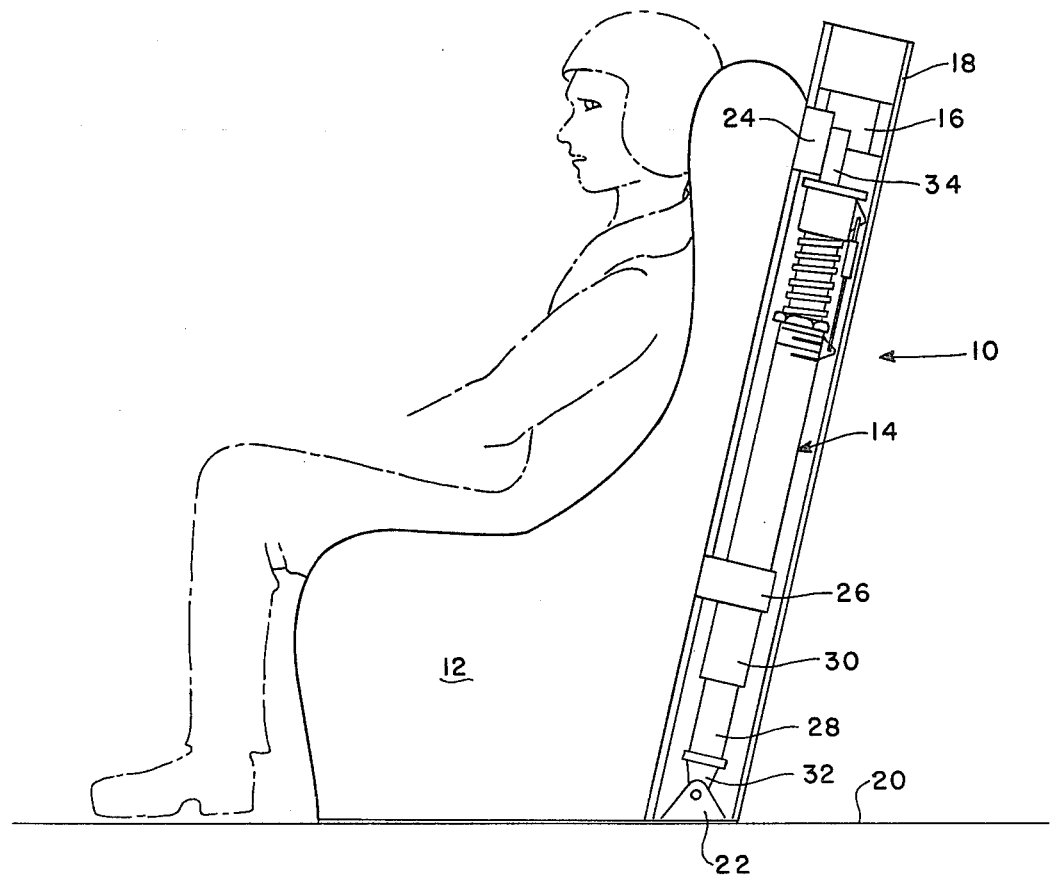
FIG. 1 is a side view of an ejection system including an ejection seat with an airman seated therein.

Referring now to the drawings, and to FIG. 1 in particular, the ejection system is designated generally by the numeral 10 and includes a seat 12 and a rearwardly inclined ejection apparatus or catapult 14, the catapult 14 being adapted, on operation, to eject the seat 12 from the aircraft to which it is fitted so that the seat 12 on leaving the aircraft initially follows a path which is somewhat rearwardly inclined with respect to the vertical datum of the aircraft.

The seat 12 is guided in its upward sliding movement, during ejection, by guiding means 16 fixed to the rear lateral edges of seat 12 and adapted to cooperate with rearwardly inclined guide channels 18 fixed to the inner sides of the fuselage of the aircraft.

The rearwardly inclined catapult 14 is fixed midway between the guide channels 18 to the floor 20 by means of bracket 22. The upper end of the catapult 14 is fixed to the seat 12 by seat bracket 24. An optional lower seat bracket 26 may be used to fix the position of catapult 14 relative to seat 12.

Figures 2, 3:
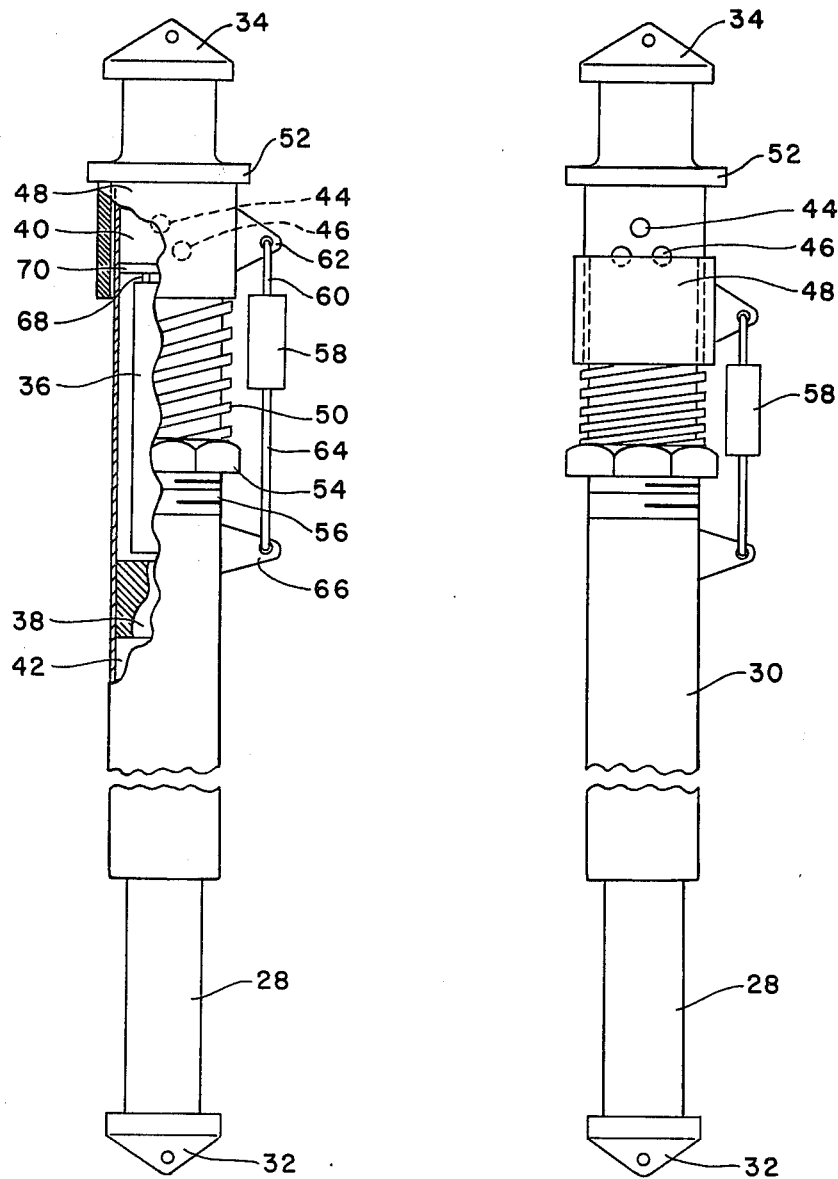
FIG. 2 is a longitudinal view, partly in section, of one embodiment of the invention.
FIG. 3 is a longitudinal view showing operation of the acceleration limiting means shown in FIG. 2 during the catapult stroke event.

The ejection apparatus or catapult 14, as shown in FIG. 2, comprises at least two telescopically cooperating parts 28 and 30. The lower part or tube 28 has a connection 32 for attachment to the floor bracket 22. The lower tube 28 fits telescopically within upper part or tube 30. Upper tube 30 has an upper connection 34 for attachment to the seat bracket 24. The upper tube 30 contains a solid propellant 36, attendant means, not illustrated, for firing the propellant, and a nozzle means 38. The space containing the solid propellant 36 is designated as the high pressure chamber 40 while a major portion of the upper tube 30 is occupied by the low pressure chamber 42 into which the propellant gas expands after passing through the nozzle means 38.

The wall portion of the high pressure chamber 40 is provided with a plurality of venting orifices 44 and 46 arranged circumferentially around the tube 30. In the embodiment illustrated, the orifices 44 are arranged at a first axial distance from the upper end of the tube 30 and the orifices 46 are arranged at a second axial distance from the end of the tubes 30, with the number of orifices 46 being a multiple of the number of orifices 44, in this case the multiple being two.

A sleeve 48 is provided around and in sliding relation with tube 30 to normally cover the vent orifices 44 and 46. The sleeve 48 is held in its normal covering position by spring means 50 which urges the sleeve 48 upward against radial stop 52, the latter being fixed to tube 30. The spring means 50 is held in position by a lower stop, which in the embodiment shown is an adjustable stop consisting of a threaded nut 54 which is axially adjustable by means of threads 56 provided in the outer surface of tube 30. The stop nut 54 is made adjustable in order to vary the preloading of the spring means 50 in order to compensate for differences in burning characteristics in different batches of solid propellant.

A damping means 58 is provided in association with the sleeve 48 and tube 30 to control the dynamic response of sleeve 48. The damping means is connected at one end through connecting rod 60 to bracket 62 attached to sleeve 48 and at its other end through connecting rod 64 to bracket 66 attached to tube 30.

The solid propellant 36 is generally cylindrical in shape. It is necessary to space it axially within the high pressure chamber 40 either from the upper end or the lower end of chamber 40. In the embodiment illustrated, the propellant 36 is spaced axially from the upper end of chamber 40. For this purpose, at least three steel wires 68 or rods extend longitudinally and equally spaced angularly from a support 70 at the upper end of chamber 40. The propellant 36 may also be spaced axially from the lower end of chamber 40, in which case the venting orifices 44 and 46 are located radially around this spatial void.

After ignition in the usual manner, the catapult 14 functions in the customary manner, i.e., the propellant charge 36 is ignited and the high pressure gases drive the seat and its occupant out of the aircraft and clear of obstructions. The sleeve 48 is initially constrained by the spring 50 to prevent it from moving downward. As the ejection system 10, which includes the seat 12 and the ejection catapult 14, and the airman occupant accelerate, the sleeve 48 is constrained by the spring 50 until the desired maximum acceleration is experienced. At this point, as shown in FIG. 3, the downward force of sleeve 48, which is the product of the mass of the sleeve 48 and the acceleration acting thereon, is sufficient to overcome the preloaded force of spring 50, and the sleeve 48 moves downwardly uncovering at least the first set of vent orifices 44. The damping means 58 acts to prevent oscillatory uncovering/covering of the venting orifices 44 and 46. Uncovering of the venting orifices 44/46 vents an incremental pressure from the high pressure chamber 40 which reduces the pressure within the chamber, which generally has the effect of reducing the burn rate of the propellant. As the acceleration of the ejection system and the airman occupant decreases to or below the desired maximum acceleration, the upward force exerted by spring 50 overcomes the downward force exerted by the sleeve 48, and the sleeve 48 is again pushed to rest against radial stop 52.

Figure 4:
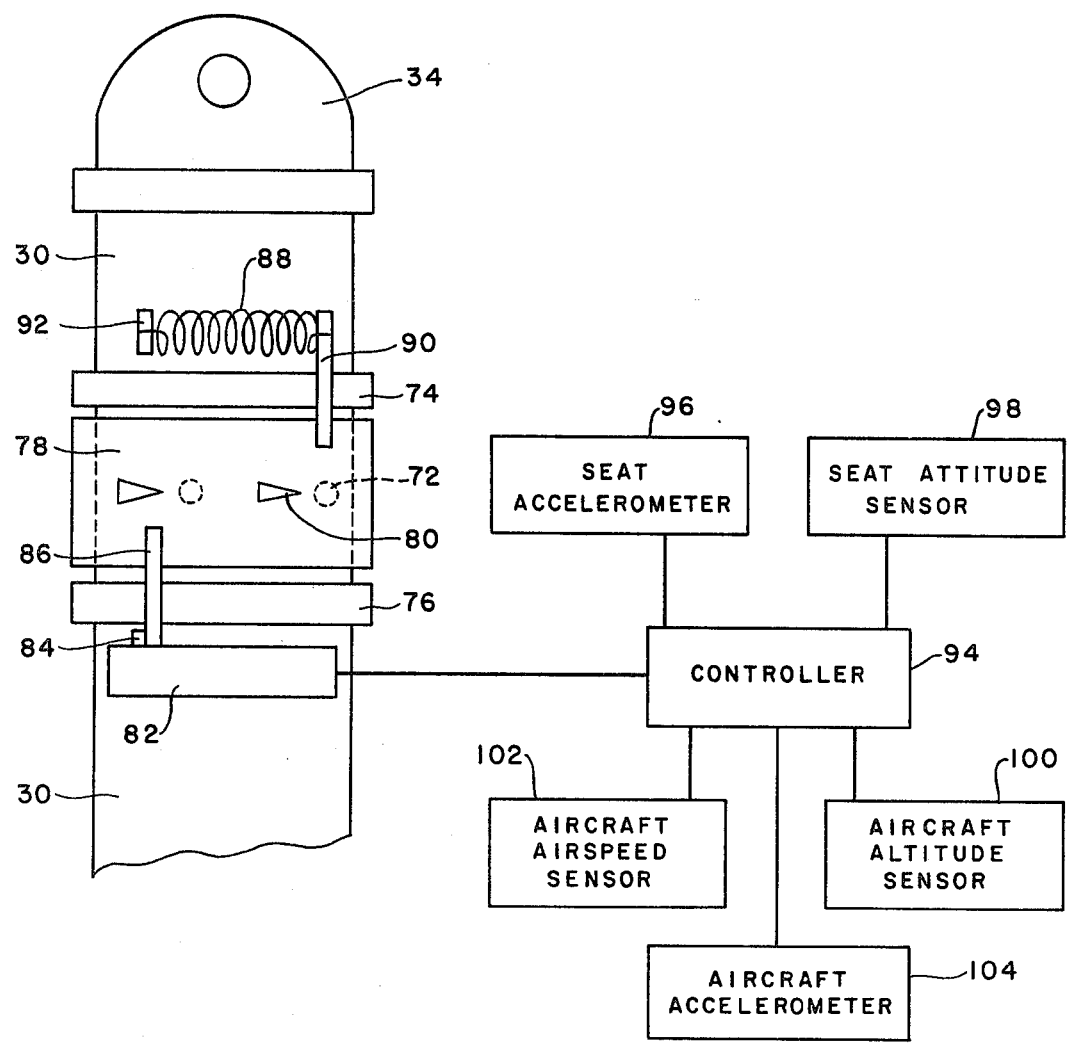
FIG. 4 illustrates another embodiment of the invention.

The embodiment shown in FIG. 4 differs from that described herebefore in that control of the vertical acceleration of an ejection seat is achieved by electromechanical means rather than purely mechanical means as described herebefore. Only the upper part of an ejection gun 14 is depicted, for the sake of simplicity. The gun 14, as shown in FIG. 4 comprises an upper tube 30 having an upper connection 34 for attachment to the seat bracket. The upper tube 30 has a plurality of venting orifices 72 arranged at desired locations around the perimeter of the tube 30. Above and below the venting orifices 72 and affixed to the tube 30 are upper and lower rings 74 and 76, respectively. Sleeve 78 is rotatably located circumferentially around the tube 30, between rings 74 and 76. Sleeve 78 has a plurality of venting control orifices 80 arranged at desired locations around its circumference. The venting orifices 72 are depicted as being circular and the control orifices are depicted as being triangular. It is understood that other shapes may be employed.

The rotatable sleeve 78 is rotated, when required to vent pressure from the high pressure chamber within the tube 30, by one or more actuating means 82 each having an actuating arm 84. The actuating means 82 is secured to the tube 30. When operated, the actuating arm 84 presses against bracket 86 which is attached to the sleeve 78, rotating the sleeve. The actuating means 82 may be a linear actuator.

The rotatable sleeve 78 may be maintained in its normally closed position, as shown, by at least one biasing means, shown here as being a coil spring 88, which is attached to sleeve 78 through a bracket 90 and to the tube 30 through bracket 92.

The operation of actuating means 82 is controlled by actuator controller 94. Controller 94 may be a simple set point controller which receives signals from an accelerometer 96 and which provides an actuating command to the actuating means 82 when the signal received from accelerometer 96 exceeds a desired preset point. Alternatively, the controller 94 may be a microprocessor which receives signals not only from the accelerometer 96 but also from other sensing devices such as, for example, a seat attitude sensor 98, an aircraft altitude sensor 100, aircraft airspeed sensor 102 and aircraft accelerometer 104, and which provides an actuating command to the actuating means 82 in response to all the signals received as well as in response to internal programming.

It will be evident to those skilled in the art that modification of the present invention can be made without departing from the scope and spirit of the appended claims.

I claim:

1. In an ejection system for emergency escape from an aircraft comprising an ejection seat and an ejection apparatus for ejecting said seat from said aircraft, said ejection apparatus comprising at least two telescopically cooperating parts, a first one of said parts having an opening at its top, with the bottom of said first part being closed and attached to said aircraft, and a second one of said parts having an opening at its bottom, with the top of said second part being closed and attached to said seat, said second part containing at least one propellant charge, the improvement which comprises means cooperatively associated with said second part to vent exhaust gas generated by said propellant charge when ignited, so long as the acceleration of said apparatus is greater than a desired level of acceleration and to cease said venting when said acceleration is no greater than said desired level.

2. The apparatus of claim 1 wherein said venting means comprises a plurality of venting orifices in said second part, a sleeve surrounding said second part and adapted for sliding relation therewith in the longitudinal direction of said apparatus, spring means for urging said sleeve in an upward direction, and stop means for limiting the upward travel of said sleeve, wherein said sleeve normally covers said venting orifices.

3. The apparatus of claim 2 additionally comprising means for adjusting the force of said spring means.

4. The apparatus of claim 2 further comprising damping means for preventing oscillatory uncovering and covering of said venting orifices.

5. The apparatus of claim 1 wherein said venting means comprises a plurality of venting orifices in said second part, a sleeve surrounding said second part and adapted for rotational movement therewith, said sleeve having a plurality of venting control orifices therein, means for preventing the axial displacement of said sleeve, biasing means for maintaining said sleeve in a normally closed position whereby said venting orifices are covered, actuating means for rotating said sleeve to place at least one of said venting control orifices in venting relation with at least one of said venting orifices, an accelerometer for generating an acceleration signal, and control means for receiving said acceleration signal and providing an actuating command to said actuating means in response thereto.

6. The apparatus of claim 5 wherein said control means is a set point controller adapted to provide an actuating command to said actuating means when said acceleration signal exceeds a preset point.

7. The apparatus of claim 5 further comprising a seat attitude sensor for generating a seat attitude signal, and wherein said control means is a microprocessor adapted to receive said acceleration signal and said seat attitude signal and to provide an actuating command to said actuating means in response to the signals received.

8. The apparatus of claim 7 further comprising an aircraft attitude sensor, an aircraft airspeed sensor and an aircraft accelerometer, each adapted to provide a signal to said microprocessor, said microprocessor being adapted to provide said actuating command in response to all of said signals.

* * * * *